Sept. 22, 1959     A. GOLOFF     2,905,022
VIBRATION DAMPER
Filed March 6, 1957     2 Sheets-Sheet 1
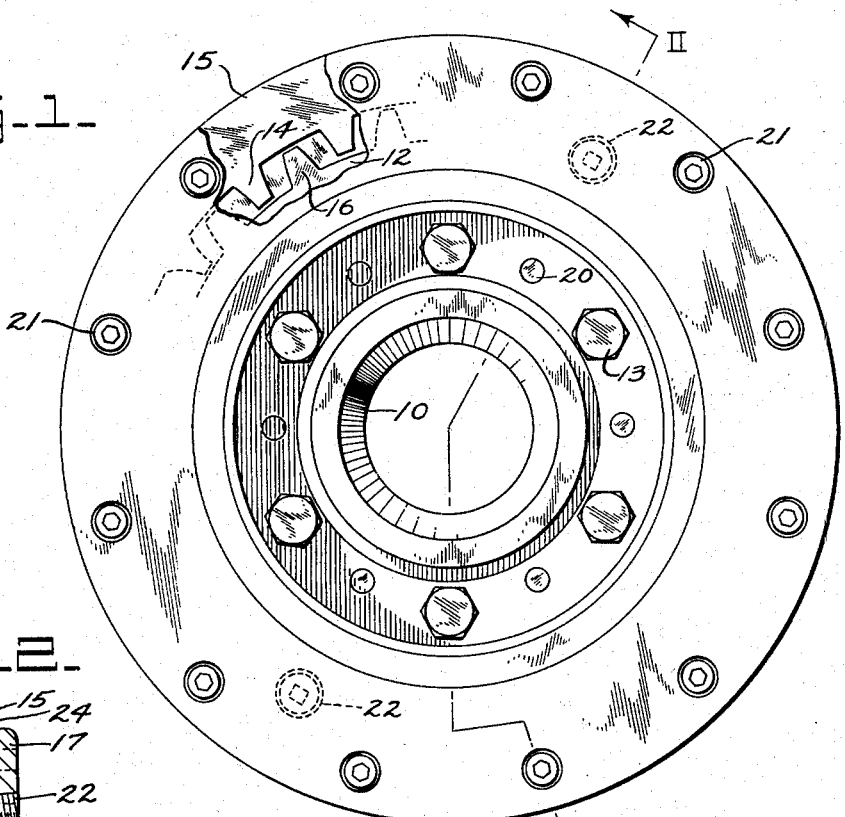
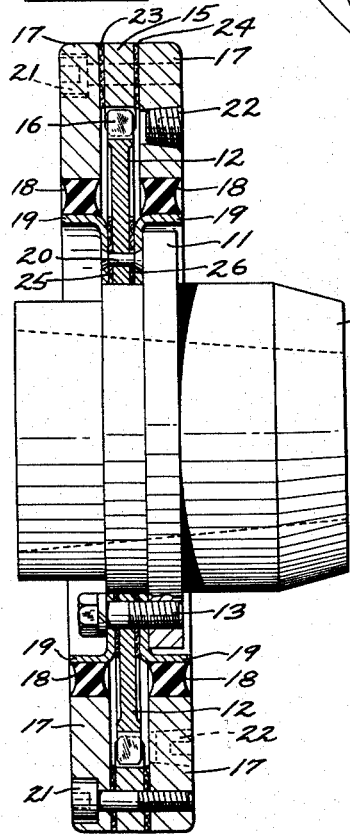
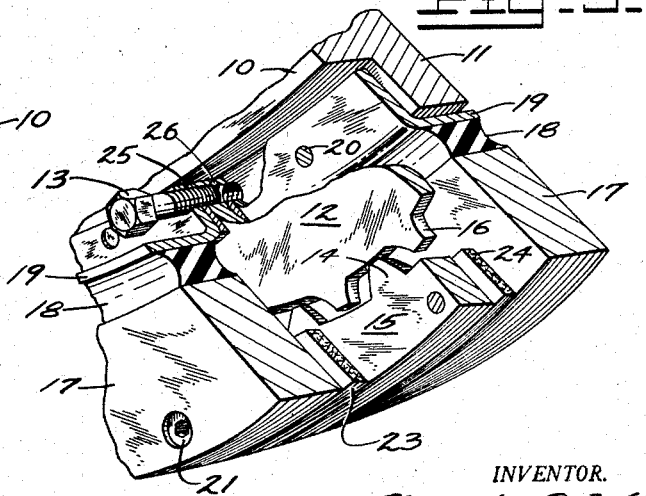
INVENTOR.
Alexander Goloff
BY
Fryer and Johnson
ATTORNEYS Sept. 22, 1959   A. GOLOFF   2,905,022
VIBRATION DAMPER
Filed March 6, 1957   2 Sheets-Sheet 2
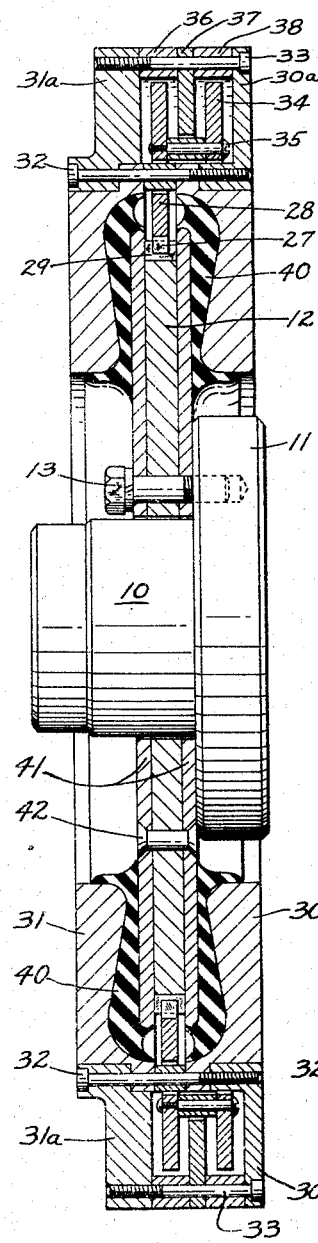
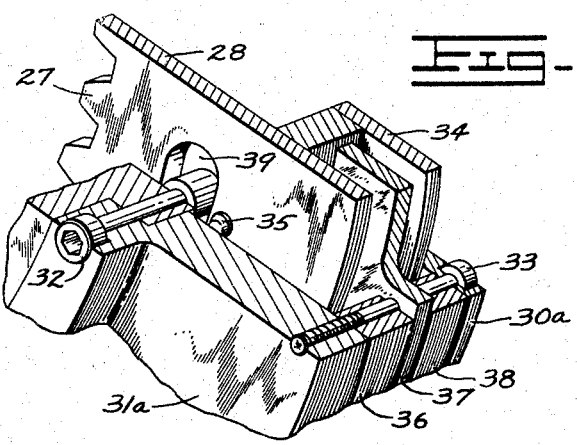
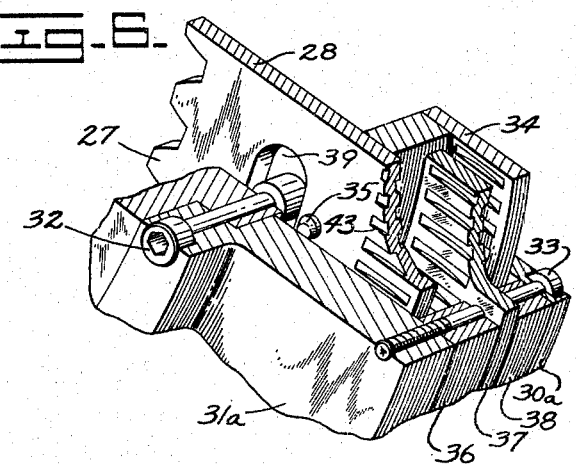
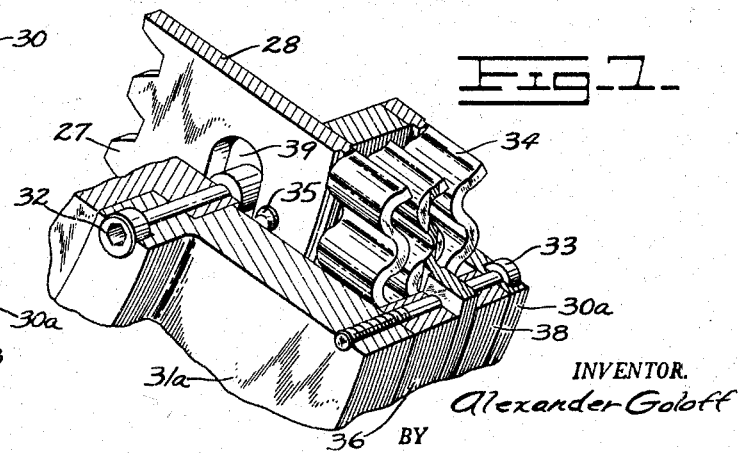
INVENTOR.
Alexander Goloff
BY
Fryer and Johnson
ATTORNEYS ated Sept. 22, 1959

United States Patent Office 2,905,022
Patented Sept. 22, 1959

2,905,022

VIBRATION DAMPER

Alexander Goloff, Washington, Ill., assignor to Caterpillar Tractor Co., Peoria, Ill., a corporation of California Application March 6, 1957, Serial No. 644,410

6 Claims. (Cl. 74—574)

This invention relates to means for damping torsional vibrations in rotary masses such as the crankshafts of internal combustion engines, and is particularly directed toward non-linear vibration dampers as well as tuned-and-damped vibration dampers.

Multi-throw crankshafts of internal combustion engines are caused to vibrate torsionally at certain engine speeds because of the forces to which they are subjected during engine operation. Unless such vibrations are damped, the engine may operate roughly over the range of speeds at which the amplitude of torsional vibration at the crankshaft is high, and the vibration may become so excessive as to cause breakage of the crankshaft or connected parts. In order to prevent the harmful effects of such torsional vibration, it is common practice to secure a vibration damper to one end of the crankshaft. The vibration damper usually takes the form of a mass adapted to rotate with the crankshaft, and secured to the crankshaft by means of a suitable resilient material, such as rubber. When a vibration damper is applied to a crankshaft, it is usually secured to the end of the crankshaft opposite the flywheel. Because of its weight, natural frequency of vibration and slight damping in the suspension system itself, it provides an added mass to that end of the crankshaft subject to the greatest torsional vibration and has the effect of maintaining the amplitude of such vibrations within predetermined limits.

Presently available tuned dampers are usually restricted to one type of damping action such as viscous and, although not restricted to damping vibrations of one harmonic order, they are effective at only one predetermined frequency which does not vary with engine speed. Likewise, they have a relatively short life due to fatigue deterioration of the resilient material within the damper. On the other hand, the non-tuned, presently available dampers of the kind employing an inertia mass separated from a housing only by a viscous fluid and referred to as the Lanchester type, are frequently subject to metal-to-metal contact between the inertia mass and the housing, which not only causes excessive heat to be generated during operation of the damper but also requires costly machining. This excessive heat causes the viscosity of the compound within the damper to vary and also results in premature decomposition of the compound. A change in viscosity or decomposition of the compound causes erratic performance and short life in a damper. There is also a problem in maintaining the liquid compounds in place within current dampers since they are difficult to seal.

It is an object of this invention to provide a vibration damper which gives the same type of damping as is achieved in a spring-action viscous damper as well as a "pumping-type" damper with a spring action.

Another object is to provide a vibration damper having damping action in combination with a torsionally prestressed resilient tuning material.

Another object of this invention is to provide a damper in which tuning and damping are automatically variable with engine speed, and in which the tuning and damping functions are independently selectable.

Another object is to provide a tuned damper in which a portion of the tuning is a result of cavity volume.

It is a further object of this invention to provide a damper in which resilient material is torsionally prestressed to greatly extend dynamic life without inducing significant deterioration of static, or shelf, life.

Another object is to provide a damper which may be inexpensively produced due to broad machining tolerances.

Another object is to provide a damper in which there is no metal-to-metal contact between the inertia mass and the housing to cause excessive operating temperature.

It is a still further object of the invention to provide a damper in which inexpensive cork or paper gasket joints are acceptable as a sealing means.

In the drawings:

Fig. 1 is a view in front elevation with parts broken away of a damper embodying the present invention;

Fig. 2 is a view in section along line II—II of Fig. 1;

Fig. 3 is a fragmentary isometric view with parts broken away;

Fig. 4 is a sectional view similar to Fig. 2 with parts broken away showing a modification of the present invention;

Fig. 5 is a fragmentary isometric view of a part of the modification shown in Fig. 4;

Fig. 6 is a fragmentary isometric view showing an additional modification; and

Fig. 7 is a fragmentary isometric view of still another modification.

In the drawings, a damper hub 10 is shown as having a flange 11 to which a plate 12 is attached by capscrews 13. As shown in Figs. 1 through 3, internal teeth 14 of a damping ring 15 are located between teeth 16 formed on plate 12. The clearance around and between teeth 14 and 16 is such that adequate space is provided between the teeth to permit the introduction of a damping compound, such as a silicone fluid or paste, between the contact surfaces of the teeth, and no metal-to-metal contact is present in operation.

Plate 12 is secured to spaced inertia weights 17 by resilient rings 18 which are bonded to the inner diameters of the inertia weights and to flanged parts 19. Parts 19, in turn, are secured to plate 12 by rivets 20.

The large clearance between the inertia weights 17 and the plate 12 prevent any metal-to-metal contact between relatively moving parts. Through this structure, no premature failure of the damper is effected by excessive heat generated during operation, nor is there any impact failure of the metal. Likewise, these large clearances allow the damper to be inexpensively produced due to the broad machining tolerances involved.

The resilient rings 18 are of a selected hardness and are torsionally prestressed to a predetermined degree at the time the damper is assembled. Prestressing torsionally has the effect of greatly extending dynamic life of the damper without inducing excessive deterioration of static life. The resilient rings likewise support the damping weight and furnish part of the required tuning of the mass of the damper. The rings also serve as sealing means to retain the damping compound in place.

The inertia weights 17, which form the housing or case of the damper, are secured to the damping ring 15 by capscrews 21. Plugs 22 are provided at one or more points in the inertia weights 17 for the introduction of a damping fluid or paste in the cavities formed between the teeth 16 of plate 12 and the teeth 14 of damping ring 15. The damping compound is preferably a silicone compound, although an ordinary lubricating grease may be used. The characteristics of the damping compound determine to some extent the type of damping obtained, such as straight viscous, coulomb, and others. By selecting the consistency, viscosity or amount of the damping compound, a different damping action may be obtained to meet various damping requirements. Since damping compounds are compressible, they may be used to introduce not only damping forces but spring forces as well. As the speed of the damper increases, relative motion between the teeth 14 and 16 tends to create a momentary void, but centrifugal action at the higher speeds urges the viscous compound outwardly into the spaces between the teeth. Thus, the teeth do not approach each other as readily as they would at slower speed, and the damper will exhibit a desirable increase in stiffness as engine speed increases. Also, due to higher excitation frequency of the damper as the speed of the damper increases, there is less time for the damping compound to be pumped from between the teeth 14 and 16. This feature also contributes to increase in damper stiffness at higher engine speeds since it restricts the relative movement of the teeth. Thus, as the compressibility of the cavities between teeth 14 and 16 varies with the speed of operation, the constant of the damper spring likewise varies with speed.

Likewise, as the speed of operation increases, the damping compound is compressed to a greater extent between the teeth instead of being pumped as at lower speeds. Since compressibility of the damping compound affects tuning, this results in tuning which varies according to the spacing or volume between the teeth. Thus, as the compression of the damping compound in this damper varies with the speed of operation, the spring forces likewise vary with the speed of operation. This results in a variable rate damper having damping action and spring rate which increase with increase in engine speed.

Gaskets 23 and 24 of any suitable material serve as sealing means between each of the inertia weights 17 and the damping ring 15 to retain the damping compound between the teeth 14 and 16 and in the chamber which houses the teeth. Gaskets 25 and 26 are provided as seals between each of the flanges 19 and the plate 12.

Figs. 4 through 7 show modifications of the construction shown in Figs. 1 through 3 in which the same type of pumping action and spring action is obtained through slightly different structures. The constructions are similar in that the modifications, as shown in Figs. 4 to 7, also disclose a damper hub 10 as having a flange 11 to which a plate 12 is attached by capscrews 13. However, in the modifications, internal teeth 27 of damping ring 28 mesh closely with the peripheral teeth 29 of the plate 12 simply to form a driving connection between these parts. The damping ring 28 is of less thickness than the plate 12 to provide clearance between the ring and an inertia weight which is composed of two symmetrical halves 30 and 31. The two halves of the inertia weight are held together by capscrews 32. These capscrews also secure extensions 30a and 31a to the weight portions 30 and 31, respectively, and the extensions are connected to each other by capscrews 33.

An additional damping ring 34 is attached in spaced relationship to ring 28 by capscrews 35. Interposed between the two parts 30a and 31a of the inertia weight are annular rings 36, 37 and 38 secured between the weights by the capscrews 33. Ring 37 oscillates between the damping rings 28 and 34 with sufficient axial clearance provided for the introduction of a damping compound. Elongated holes 39 in the damping ring 28 are provided to clear capscrews 32 to allow relative motion between the crankshaft (not shown) and the inertia weight 30—31.

Resilient rings 40 of a selected hardness are bonded to each half 30 and 31 of the inertia weight and to annular plates 41. Plates 41 are secured to plate 12 by rivets 42. The resilient rings 40 are torsionally prestressed to a predetermined degree and thus act in the same manner as the resilient rings 18 shown in Figs. 2 and 3.

In the modification shown in Figs. 4 and 5, the spaces between the damping rings 28, 34 and 37 are filled with damping compound. The rings are smooth-faced to provide a skin friction-type damping, known as viscous damping.

In the modification shown in Fig. 6, the construction is as previously described except that the working faces of the damper rings carry radial grooves 43. In operation, these grooves provide additional agitation and cavitation to meet different damping requirements. The modification shown in Fig. 7 is likewise the same as the construction shown in Figs. 4 and 5 except that the working faces of the damping rings are corrugated, as shown. These corrugations provide pumping action which results in non-linear damping.

By selecting the torsional prestressing and proportions of the resilient rings and by varying the volume between the teeth, the tuning functions may be varied. Likewise, by selecting the viscosity and amount of the damping compound as well as the configuration of the damping rings, the damping functions of the damper may be varied. Thus, through the use of independently selectable means, this damper gives the same type of damping as a spring-action viscous damper as well as a pumping-type damper with a spring action. This results in a combination of stiffness and damping which are variable with speed.

I claim:

1. A vibration damper having independently preselectable tuning means and independently preselectable damping means, the damper comprising a hub, a plate rigidly secured to the hub, teeth provided on the outer periphery of the plate, inertia weights comprising the outer housing of the vibration damper and forming an annular chamber, the inertia weights being resiliently secured for relative motion with respect to the plate, a damping ring rigidly secured between the two halves of the inertia weights, teeth provided on the inner periphery of the damping ring, damping compound retained within the chamber, the teeth of the plate and the teeth of the damping ring loosely meshing within the chamber to impart a variable pumping action and a variable spring action to the damping compound.

2. A vibration damper having independently preselectable tuning means comprising a hub, a plate rigidly secured to the hub, teeth provided on the outer periphery of the plate, a housing enclosing the plate, torsionally prestressed resilient means securing the housing to the plate in spaced relation thereto, at least one damping ring carried by and disposed within the housing, teeth provided on the damping ring to mesh loosely with the teeth of the plate, damping compound within the housing adapted to fill the space between the loosely meshing teeth of the plate and the teeth of the damping ring whereby vibration will effect compression of the damping compound between said teeth and impart a tuning effect to said damper.

3. A vibration damper comprising a hub, a plate rigidly secured to the hub, teeth provided on the outer periphery of the plate, a housing enclosing the plate, torsionally prestressed resilient means securing the housing to the plate in spaced relation thereto, at least one damping ring carried by and disposed within the housing, teeth provided on the damping ring to mesh loosely with the teeth of the plate, damping compound within the housing adapted to fill the space between the loosely meshing teeth of the plate and the teeth of the damping ring whereby agitation of the damping compound in combination with the resilient means provides a non-linear damping action.

4. In a vibration damper having independently preselectable tuning means and independently preselectable damping means, a housing providing an annular chamber, damping compound retained within the chamber, a hub, a plate secured to the hub and extendnig radially into the chamber, at least one damping ring within the chamber loosely secured for limited relative movement with respect to the housing, the housing being resiliently secured to the plate, an annular ring rigidly secured to the housing and axially spaced from the damping rings, the damping rings and the annular ring being adapted to agitate the damping compound during operation of the damper to provide variable damping.

5. A vibration damper comprising a hub, a plate rigidly secured to the hub, teeth provided on the outer periphery of the plate, inertia weights forming a housing with an annular chamber, the inertia weights being resiliently secured to the plate, at least one damping ring disposed between the inertia weights for limited relative motion therewith, teeth provided on the inner periphery of one damping ring to mesh with the teeth of the plate, an annular ring rigidly secured to the housing in spaced and overlapping relation to the damping ring, damping compound within the chamber adapted to fill the space between the damping rings and the annular ring, and radial grooves provided on the faces of the damping rings and the annular ring to impart agitation to the damping compound.

6. A vibration damper comprising a hub, a plate rigidly secured to the hub, teeth provided on the outer periphery of the plate, inertia weights forming a housing with an annuluar chamber, the inertia weights being resiliently secured to the plate, at least one damping ring disposed between the inertia weights for limited relative motion therewith, teeth provided on the inner periphery of one damping ring to mesh loosely with the teeth of the plate, an annular ring rigidly secured to the housing in spaced and overlapping relation to the damping ring, damping compound within the chamber adapted to fill the space between the damping rings and the annular ring, and corrugations provided on the faces of the damping rings and the annular ring to impart agitation to the damping compound.

References Cited in the file of this patent

UNITED STATES PATENTS

| 2,724,983 | O'Connor | Nov. 29, 1955 |

FOREIGN PATENTS

| 365,832 | Great Britain | Jan. 28, 1932 |
| 957,698 | France | Aug. 29, 1949 |
| D. 122,971a/46a | Germany | Dec. 15, 1955 |

OTHER REFERENCES

Publication, Product Engineering, pp. 57–59, February 1940.